July 17, 1923.
V. CASOLETTI
COFFEE MAKING OR BREWING MACHINE
Filed Nov. 3, 1920
1,462,322
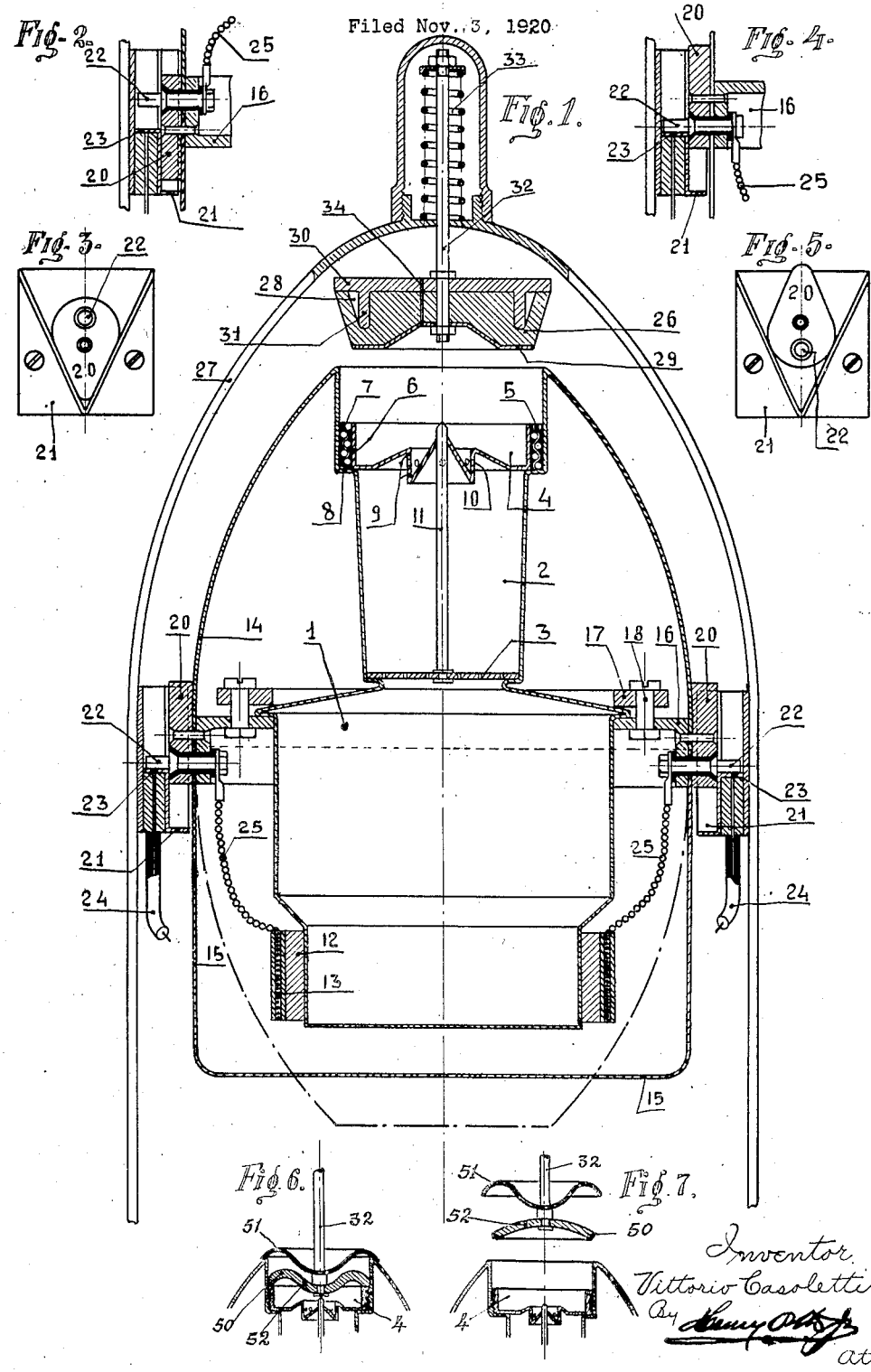
Inventor
Vittorio Casoletti
By
atty.

Patented July 17, 1923.

1,462,322

UNITED STATES PATENT OFFICE.

VITTORIO CASOLETTI, OF TURIN, ITALY.

COFFEE MAKING OR BREWING MACHINE.

Application filed November 3, 1920. Serial No. 421,558.

*To all whom it may concern:*

Be it known that I, VITTORIO CASOLETTI, a subject of the King of Italy, and resident of 94 via Massena, Turin, in the Kingdom of Italy, have invented certain new and useful Improvements in Coffee Making or Brewing Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in coffee making or brewing machines and is characterized by the fact that the ground coffee is placed between two filters in a container, hereinafter called the filter chamber, said container forming part of the kettle containing the water required for the purpose of making the coffee in such a manner, that any packing to prevent leakage of water or steam is unnecessary; an additional characteristic feature of the invention is that, at the moment of ebullition of the water, the coffee machine will tilt over. This object is attained by pivoting said machine, below its centre of gravity, and by maintaining it in its working position by means of a stopper which, as soon as the water has reached the required boiling point, will be raised under the action of the pressure of the steam, causing the coffee machine to tilt. In addition a self actuating device has been incorporated which will break the circuit if an electric current is used for the purpose of heating the water.

The improvements forming the subject of this invention chiefly relate to the self actuating device for cutting out the electric current on the tilting over of the kettle, consisting of two insulated pivots connected with the resistance of the electroheating arrangement and resting on contact plates which are connected with the outer line when the kettle is in its vertical position and disconnected therefrom by the tilting over of the coffee machine thus breaking the circuit during filtration.

Further according to the present invention an electroheating arrangement is provided which encloses the lower sides of the kettle near the bottom or, a short distance therefrom, in order to maintain at the bottom a small quantity of water at a lower temperature which improves the working of the machine as well as the coffee, a metal ring being placed between the resistance and the kettle in order to increase the heating efficiency of the device.

Moreover the filter openings are so arranged as to lie in a plane parallel to the axis of the filter chamber in order to eliminate any clogging of the openings, and the form and mounting of the stopper for preventing the tilting are such as to obtain a more regular working.

Further, the arrangement for keeping the kettle in the tilted position consists of a heart shaped eccentric, the tapered part of which engages a recessed piece attached to the frame and serving as a support when the kettle is tilted over and stops the kettle almost instantaneously, any oscillation in the vertical reversed position being prevented.

In the accompanying drawings is illustrated by way of example a constructional form of this coffee making machine:

Fig. 1 is an elevation thereof partially sectioned showing the kettle in its vertical position.

Figs. 2 and 3 are a sectional and front view respectively of the self actuating circuit breaking and stopping device, the kettle being in the tilted over position.

Figs. 4 and 5 are similar views of the above device the kettle being in the upright position.

Figs. 6 and 7 show a constructional form of the stopper.

The coffee machine consists chiefly of a kettle —1— with a sheet metal filter chamber 2, a filter 3 located at the junction of the kettle 1 and the filter chamber 2 at the opposite end of which a second filter 4 is arranged (better after inserting the usual perforated partition) and kept in position by being screwed into the filter chamber. The thread of this second filter may be quickly and cheaply constructed by soldering a metal wire 5 to the inner side of the filter chamber 2, the threads of which must be evenly spaced. On to the flange 6 of the filter a similar wire 7 is soldered forming a thread corresponding to that on the filter chamber, or said thread may be stamped in the metal sheet. The upper filter 4 hermetically closes the filter chamber by means of the screw threading heretofore referred to and by a suitable shoulder 8 against which it presses.

The bottom of the filter 4 may conveniently be constituted by a perforated disc or, better still, as shown in Figure 1, said bottom comprises a cylindrical axial portion 9 pierced by several rows of holes 10 through which the infusion is filtered. According to this particular arrangement, these openings are in a plane parallel to the direction of the pressure exerted by the coffee and therefore are not easily stopped up. The lower filter 3 is provided with a rod 11, which, passing through a central opening in the upper filter 4, extends above the same and projects from the exhausted ground coffee allowing it to be easily drawn out. On the lower narrower part of the kettle is arranged an iron ring 12, on which is wound the insulated resistance 13. The ring 12 stores the heat in order to keep the kettle hot during a certain time after the current is interrupted and allows all the water to filter through the coffee compressed between the filters, unless the burner be itself of a sufficient heating efficiency.

/The kettle and the filter chamber are finally enclosed within an outer vessel or container 14, acting as a safeguard if perchance the internal pressure should cause a break or fracture due to faulty construction of the kettle.

Said container consists of two cup-shaped parts 14 and 15 which are superposed and connected to a ring 16 having an angular section and attached to the kettle 1 by means of the counter ring 17 which is connected with the ring 16 by means of the screws 18.

To the ring 16 are attached, opposite each other, two heart shaped eccentrics 20, which, in the upright position of the kettle, have their tapered ends turned upwards and are free to rotate through a certain angle in the triangular recess of the supports 21, in which they are lodged.

When the kettle is completely tilted over, the tapered ends of the eccentrics 20 rest against the sides of the recess in the supports 21 and they keep the coffee machine in the newly assumed position, preventing any further oscillation.

In the drawings, the eccentric device is incorporated with the self acting interrupter and consists of two insulated metal pivots 22 mounted in the eccentrics 20 and so arranged that in the upright position of the kettle, said pivots rest on the contact plates 23. Said plates are connected with the outer line 24 and the pivots 22 are connected by means of wires 25 with the resistance 13, so that in the upright position of the kettle the circuit is closed, (Figs. 4 and 5).

As soon as the kettle is tilted over, the pivots 22 being arranged eccentrically are withdrawn from the plates 23; cutting out the electric current.

The kettle is so constructed that it will rotate about a diametral axis situated below its centre of gravity. It is therefore in a condition of unstable equilibrium, tending to tilt over, and is only prevented from so doing by the provision of a stopper 26 attached to the carrier 27 of the kettle, and inserted in the outlet of the filter chamber.

This stopper may, for instance, be constructed of hard rubber, and may be tapered and truncated and have a circular groove 28 cut into its upper surface to increase its pliability ensuring its tight closing. The stopper is conveniently held between lower and upper discs 29 and 30, the latter of which is constructed with a flange 31 which penetrates into the groove. The discs and the stopper are held together by means of a rod 32, which also serves for guiding the stopper and penetrates the upper wall of the carrier 27. Said rod tends to move upwards under the influence of a spring 33, so that the stopper will be raised entirely out of the filter chamber 2 and thus allow the tilting of the kettle which it has hitherto prevented.

In order to prevent the untimely disengagement of the stopper from the kettle, said stopper is provided with a small hole 34, through which the air in the kettle escapes when it expands, owing to the increase in temperature. When steam is formed, the pressure cannot discharge through the small hole, and increases until the stopper is expelled and the kettle tilts over.

When required for use, water is poured into the kettle, the upper filter placed in position, and the ground coffee poured into the filter chamber.

The electric current may now be switched on, the water becomes heated and eventually commences to boil, the steam percolates through the coffee and the stopper disengages from the opening of the filter chamber, this action frees the kettle which will tilt over, the outlet coming to rest above the coffee pot or other receptacle. A certain amount of water at the temperature of 100° C. having been left on the bottom, the same, mixing with the new supply of water will delay its vaporization thus preventing any loss of the liquid during the tilting. Means may be provided whereby, during the process of tilting, the upwardly moving stopper may actuate a signalling or an indicating device. At the same time the electric current is interrupted.

The heat retained by the heating device and by the iron ring, is sufficient to maintain the requisite pressure to effect a speedy filtration of the boiling water through the coffee.

To ensure an entire and complete using up of the coffee, the latter is placed in the filter chamber in the form of a thick layer of small diameter, consequently the pressure in the kettle must be comparatively high, and this is provided for, as the arrangement is such that no steam or water can escape and consequently no packing is required which is an advantage since such packing does not completely prevent the escape of steam or water and moreover is quickly destroyed.

After the filtering process is finished the steam escaping from the kettle carries any water remaining in the coffee with it. In the filter there remains a compact sufficiently dry coffee block, which may be almost without altering its shape, taken out from the coffee machine. To facilitate the emptying and cleaning of the coffee machine, the sides of the filter chamber are slightly tapered, and that part carrying the threads has a slightly larger diameter than the filter chamber itself.

Referring to Figs. 6 and 7 the stopper may be composed of a spherical cap 50 of elastic material the diameter of which is a little smaller than that of the coffee machine. Said cap is attached to the end of the shaft 32 together with a metallic cover 51. By forcing said stopper into the coffee machine, it will become deformed as shown in Fig. 6, ensuring a perfect tight fitting, as the cover 51 prevents a further deformation downwards, as would be produced by the elasticity of the cap.

The steam pressure pushes the cap upwards allowing it to resume its former shape and setting it free to raise under the spring action.

Claims:

1. In a coffee making and brewing machine, a supporting frame, a water kettle, trunnions on the kettle below its center of gravity journaled in the frame and a stopper connected to the frame and normally mounted in the discharge opening of the kettle thereby holding the latter in unstable equilibrium, said stopper adapted to be ejected from the discharge opening by steam pressure generated in the kettle, whereby the normal position of the latter is reversed.

2. A coffee making or brewing machine comprising a kettle, a filter chamber carried by and communicating with the kettle, supporting means on the kettle adapted to permit rotation of the latter, a heat accumulator mounted on the kettle, an electrical resistance mounted on the accumulator, an electrical conductor, and means controlled by the rotation of the kettle to connect and disconnect the conductor and resistance.

3. A coffee making or brewing machine, comprising a kettle, a filter chamber carried by and communicating with the kettle, a casing carrying the kettle and filter, trunnions mounted on the casing, supports in which the trunnions are rotatably mounted, a heat accumulator on the kettle, an electrical resistance mounted on the accumulator, an electrical conductor, and means connected with the resistance arranged eccentrically to the axis of the trunnions to electrically connect and disconnect the conductor and resistance by the rotation of the casing.

4. A coffee making or brewing machine comprising a rotatable casing containing a kettle, a filter chamber, eccentrics fixed on the casing below the center of gravity thereof, supports in which the eccentrics are rotatably mounted, means for holding the casing in a fixed position, a heat accumulator mounted on the lower part of the kettle, an electrical resistance connected to the accumulator mounted on the lower part of the kettle, an electrical resistance connected to the accumulator, electrical conductors, and electrical terminals for the resistance mounted on the casing eccentric to the axis of rotation of the latter whereby said terminals are moved into and out of electrical connection with the conductor by the rotation of the casing.

5. A coffee making and brewing machine, comprising a rotatable casing, a kettle and a filter chamber mounted in the casing, an electric heater mounted on the kettle, an electrical conductor, heart-shaped eccentrics fixed on opposite sides of the casing, supports for the eccentrics having recesses to receive the tapered ends of the latter to maintain the casing in an inverted position, a stopper for the casing adapted to hold the latter in an upright position, and electrical terminals for the heater adapted to be moved into and out of electrical connection with the conductor by the movements of the casing.

6. In a coffee making and brewing machine, a rotatable casing having an opening in one end, a kettle mounted in the casing, a coffee container carried by and communicating with the kettle, means for heating the kettle, means for supporting the casing in a state of unstable equilibrium, and means for holding the casing upright including a resilient concavo-convex cap of smaller diameter than said opening and deformable in the latter for closing the same, said holding means and cap being operable by pressure generated in the kettle to release the casing, whereby the latter automatically rotates on the supporting means.

In testimony that I claim the foregoing as my invention, I have signed my name.

VITTORIO CASOLETTI.